(12) United States Patent
Wong et al.

(10) Patent No.: US 11,554,471 B2
(45) Date of Patent: Jan. 17, 2023

(54) ELASTOMERIC EXHAUST REED VALVE FOR COMBUSTION DRIVEN FASTENER HAND TOOL

(71) Applicant: Power Tech Staple and Nail, Inc., Monterey Park, CA (US)

(72) Inventors: Raymond Wong, Alhambra, CA (US); Shih-Yi Chen, Taoyuan (TW); Chin-Chuan Chen, Taoyuan (TW)

(73) Assignee: Power Tech Staple and Nail, Inc., Monterey Park, CA (US)

( * ) Notice: Subject to any disclaimer, the term of this patent is extended or adjusted under 35 U.S.C. 154(b) by 518 days.

(21) Appl. No.: 15/219,199

(22) Filed: Jul. 25, 2016

(65) Prior Publication Data

US 2017/0021485 A1 Jan. 26, 2017

Related U.S. Application Data

(60) Provisional application No. 62/196,196, filed on Jul. 23, 2015.

(51) Int. Cl.
*B25C 1/08* (2006.01)
*E02F 3/40* (2006.01)
*F16K 15/16* (2006.01)

(52) U.S. Cl.
CPC .............. *B25C 1/08* (2013.01); *E02F 3/40* (2013.01); *F16K 15/16* (2013.01)

(58) Field of Classification Search
CPC .......... B25C 1/08; B25C 1/001; B25C 1/008; B25C 1/042; B25C 1/043; B25C 1/25; B25C 1/143; E02F 3/40; F16K 15/16

USPC ........ 137/512.15, 512.4; 173/8, 9, 106, 107, 173/177
See application file for complete search history.

(56) References Cited

U.S. PATENT DOCUMENTS

| 654,321 A | * | 7/1900 | O'Crowley | ........... F16K 15/148 137/512.15 |
| 1,867,478 A | * | 7/1932 | Stelzner | .............. A61M 16/208 137/854 |

(Continued)

FOREIGN PATENT DOCUMENTS

| CA | 2784501 C | * | 9/2018 | ........ A61M 16/0468 |
| WO | WO2007/048006 A2 | | 4/2007 | |

OTHER PUBLICATIONS

PCT/US2016/043653 International Search Report and Written Opinion, dated Oct. 20, 2016.

*Primary Examiner* — Thanh K Truong
*Assistant Examiner* — David G Shutty
(74) *Attorney, Agent, or Firm* — Canady & Lortz LLP; Bradley K. Lortz

(57) ABSTRACT

An exhaust valve comprising an elastomeric flap portion (e.g. of silicone) covering one or more exhaust ports in a normally closed position for a combustion driven fastener hand tool is disclosed. The elastomeric flap portion is much shorter than a comparable steel reed valve, allowing it to be disposed in small spaces. A single flat piece of elastomeric material can be configured held fixed to a housing surface along a line between one or more pairs of ports such that a flap portion of the material extends to each side of the line and covers one of the pairs of ports. The flat piece can be conveniently held in position against the housing surface by a rib or standoff on the interior surface of an exterior housing.

15 Claims, 10 Drawing Sheets

(56) References Cited

U.S. PATENT DOCUMENTS

| | | | | |
|---|---|---|---|---|
| 2,239,262 A * | 4/1941 | Violet | ............... | F02B 27/04 181/240 |
| 3,107,659 A * | 10/1963 | Steinlein | ............... | F02B 33/30 123/73 V |
| 3,191,618 A * | 6/1965 | McKim | ............... | F02M 35/10275 137/516.11 |
| 3,354,903 A * | 11/1967 | Caruso | ............... | F16K 15/148 137/854 |
| 3,416,562 A * | 12/1968 | Freeman | ............... | F16K 15/147 137/512.15 |
| 3,652,191 A * | 3/1972 | King | ............... | F04C 27/001 418/125 |
| 3,831,628 A * | 8/1974 | Kintner | ............... | F16K 15/036 137/527 |
| 3,905,340 A * | 9/1975 | Boyesen | ............... | F02F 3/24 123/73 V |
| 3,905,341 A * | 9/1975 | Boyesen | ............... | F01L 3/205 123/73 A |
| 3,990,439 A * | 11/1976 | Klinger | ............... | A62B 18/10 137/854 |
| 4,000,723 A * | 1/1977 | Boyesen | ............... | F02M 35/1019 123/73 AA |
| 4,051,820 A * | 10/1977 | Boyesen | ............... | F02M 35/10275 123/73 A |
| 4,062,331 A * | 12/1977 | Boyeson | ............... | F01L 3/205 123/73 A |
| 4,075,985 A * | 2/1978 | Iwai | ............... | F02B 33/44 123/73 A |
| 4,143,626 A * | 3/1979 | Boyesen | ............... | F01L 3/205 123/73 A |
| 4,161,163 A * | 7/1979 | Boyesen | ............... | F02F 3/24 123/73 AA |
| 4,202,298 A * | 5/1980 | Boyesen | ............... | F02F 1/22 123/73 A |
| 4,202,299 A * | 5/1980 | Boyesen | ............... | F02B 33/04 123/73 A |
| 4,324,097 A * | 4/1982 | Schmitt | ............... | F01N 3/34 60/293 |
| 4,456,016 A * | 6/1984 | Nowacki | ............... | A61B 5/0876 128/205.23 |
| 4,535,820 A * | 8/1985 | Raines | ............... | F16K 15/148 137/854 |
| 4,696,263 A * | 9/1987 | Boyesen | ............... | F01L 3/205 123/73 V |
| 4,765,372 A * | 8/1988 | Beecher | ............... | A61M 39/24 137/843 |
| 4,838,262 A * | 6/1989 | Katz | ............... | A62B 18/10 128/205.24 |
| 4,934,362 A * | 6/1990 | Braun | ............... | A62B 18/10 128/206.15 |
| 5,163,818 A * | 11/1992 | Betsill | ............... | F04B 35/04 417/18 |
| 5,176,170 A * | 1/1993 | Boyesen | ............... | F01L 3/205 123/73 V |
| 5,243,934 A | 9/1993 | Boyeson | | |
| 5,285,816 A * | 2/1994 | Herlihy | ............... | F16K 15/144 137/856 |
| 5,325,892 A * | 7/1994 | Japuntich | ............... | A62B 18/025 137/855 |
| 5,355,910 A * | 10/1994 | Gies | ............... | B60H 1/249 137/855 |
| 5,372,109 A * | 12/1994 | Thompson | ............... | F02D 9/06 60/324 |
| 5,518,026 A * | 5/1996 | Benjey | ............... | F16K 15/148 137/512.15 |
| 5,687,767 A * | 11/1997 | Bowers | ............... | A62B 18/10 128/205.24 |
| 5,971,723 A * | 10/1999 | Bolt | ............... | F04B 13/00 137/856 |
| 6,837,265 B2 * | 1/2005 | Porter | ............... | B60H 1/249 137/512.15 |
| 6,997,145 B2 | 2/2006 | Adams | | |
| 7,013,895 B2 * | 3/2006 | Martin | ............... | A62B 18/10 128/205.24 |
| 7,028,689 B2 * | 4/2006 | Martin | ............... | A62B 18/10 128/205.24 |
| 7,201,301 B2 | 4/2007 | Moeller et al. | | |
| 7,252,110 B2 * | 8/2007 | Semeia | ............... | F16K 15/148 128/205.24 |
| 7,591,236 B2 * | 9/2009 | Moeller | ............... | F01L 7/04 123/46 SC |
| 7,634,979 B2 | 12/2009 | Adams | | |
| 8,016,046 B2 | 9/2011 | Zhao et al. | | |
| 8,051,856 B2 * | 11/2011 | Bare | ............... | A61M 16/208 128/207.14 |
| 8,365,771 B2 * | 2/2013 | Xue | ............... | A62B 18/10 128/206.15 |
| 8,925,517 B2 | 1/2015 | Adams | | |
| 9,227,656 B2 * | 1/2016 | Tojo | ............... | B62D 5/0424 |
| 10,415,227 B2 * | 9/2019 | Rodrigues | ............... | E03F 5/0407 |
| 2001/0032676 A1 | 10/2001 | Kuroshita et al. | | |
| 2005/0173489 A1 * | 8/2005 | Shkolnikov | ............... | B25C 1/08 173/210 |
| 2007/0235088 A1 * | 10/2007 | Klein | ............... | F16K 15/038 137/512.15 |
| 2008/0237295 A1 | 10/2008 | Adams | | |
| 2009/0025673 A1 | 1/2009 | Adams | | |
| 2010/0187280 A1 * | 7/2010 | Akiba | ............... | B25C 1/08 227/10 |
| 2011/0068142 A1 * | 3/2011 | Webb | ............... | B25C 1/08 227/10 |
| 2012/0000961 A1 * | 1/2012 | Zhu | ............... | B25C 1/08 227/10 |
| 2012/0181319 A1 * | 7/2012 | Iijima | ............... | B25B 21/023 227/8 |
| 2012/0210974 A1 * | 8/2012 | Adams | ............... | B23Q 5/033 123/253 |
| 2015/0369118 A1 * | 12/2015 | Adams | ............... | F02B 19/02 123/274 |

* cited by examiner

SECTION B-B

DETAIL C

DETAIL C

DETAIL C

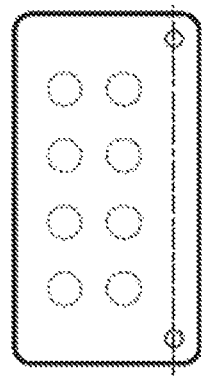
FIG. 5J
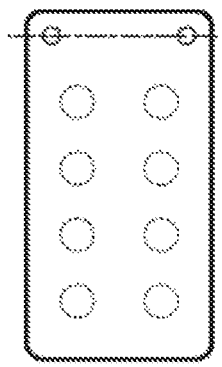
FIG. 5M
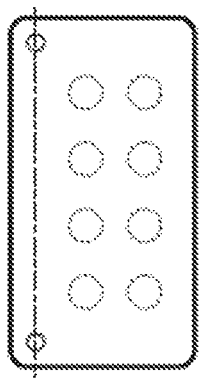
FIG. 5K
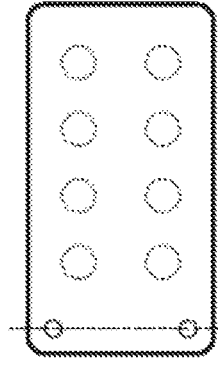
FIG. 5N
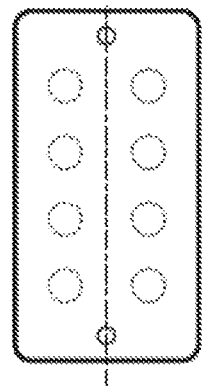
FIG. 5I
FIG. 5L

ELASTOMERIC EXHAUST REED VALVE FOR COMBUSTION DRIVEN FASTENER HAND TOOL

CROSS-REFERENCE TO RELATED APPLICATIONS

This application claims the benefit under 35 U.S.C. § 119(e) of the following U.S. provisional patent application, which is incorporated by reference herein:

U.S. Provisional Patent Application No. 62/196,196, filed Jul. 23, 2015, and entitled "ELASTOMERIC EXHAUST REED VALVE FOR COMBUSTION DRIVEN FASTENER HAND TOOL," by Wong et al.

BACKGROUND OF THE INVENTION

1. Field of the Invention

This invention relates to combustion driven fastener hand tools. Particularly, this invention relates to exhaust reed valves for combustion driven fastener hand tools.

2. Description of the Related Art

Powered fastener driving tools, e.g. nail guns, have existed for decades. Perhaps not coincidentally, the first commercial nail gun was introduced in 1950 after World War II wherein the technology for rapidly firing projectiles was greatly advanced. The first nail guns were pneumatic, driven by compressed air. Although pneumatic power is still the most prevalent, over time fastener driving tools have been developed using other means of power, such as electric motors, solenoids, combustibles, e.g., gas or explosive powder, have also been developed. Some development of technology related to powered fastener drivers, and particularly combustion driven fastener tools has occurred. However, there is still much need for further development.

Combustion driven fastener hand tools employing combustibles, e.g. gas or powder, to force a piston driver against a fastener introduce a unique set of parameters which must be properly balanced in order to achieve a working device. Sizing of the combustion chamber and valving are critical, in addition to the fuel delivery and mixing components. Moreover, greater optimization of a given design to improve power and efficiency can be greatly affected through precise understanding of the combustion process. For example, it has been determined that using a combustion chamber divided into portions having a control plate therebetween can greatly improve the efficiency and power of a combustion driven fastener device. Improvements have also been developed concerning the exhaust systems of such combustion driven fastener hand tools.

U.S. Pat. No. 8,925,517, issued Jan. 6, 2015, by Adams, which is incorporated by reference herein, discloses a gas-powered tool motor includes a combustion chamber with an intake valve at one end, an exhaust valve at another end, and a control plate or control valve between two portions of the combustion chamber. A piston or other positive displacement device is in communication with the combustion chamber. The intake and exhaust valves have closure members that are movable along a common axis in tandem between collective open positions for recharging the combustion chamber with the fuel and air mixture and collective closed positions for detonating the fuel and air mixture in the combustion chamber and displacing the positive displacement device. The control plate or control valve supports limited air flows from a first portion of the combustion chamber to a second portion of the combustion chamber even in the closed position of the control valve for supporting two-stage combustion.

U.S. Pat. No. 7,201,301, issued Apr. 10, 2007, by Moeller et al., discloses a combustion-powered fastener-driving tool includes a combustion-powered power source including a cylinder defining a path for a reciprocating piston and an attached driver blade, the piston reciprocating between a pre-firing position achieved prior to combustion and a bottom out position. Upon combustion in the power source, the cylinder includes at least one exhaust valve configured for releasing combustion gases from the cylinder. The at least one exhaust valve is dimensioned so that sufficient gas is released to reduce post-combustion pressure in the cylinder to approximately one atmosphere in the time available for the piston to travel past the at least one exhaust valve and return to the at least one exhaust valve.

U.S. Pat. No. 6,997,145, issued Feb. 14, 2006, by Adams, discloses a recycling system for linear motors includes a dual piston within a cylinder housing that is moved from an upper position to a lower position by combustion pressure such that a first portion of the piston pumps compressed air from a first air chamber within a first bore of the cylinder housing and a second portion of the piston pumps compressed air from a second air chamber within a second larger bore of the cylinder housing. An exhaust valve is opened by the compressed air for venting the combustion chamber to atmosphere. The dual piston moves within the cylinder housing from the lower position to the upper position assisted by the compressed air such that a portion of the volume of the combustion chamber is converted into a portion of the volume of the second air chamber. A control valve is opened in response to movement of the dual piston through the upper position for allowing airflow from the second air chamber into the combustion chamber.

U.S. Pat. No. 7,591,236, issued Sep. 22, 2009, by Moeller et al., discloses a combustion nailer configured for reducing intake of contaminated air during operation, includes a combustion engine having a cylinder with a piston reciprocating between a prefiring position and a fully extended position, and at least one air port in the cylinder below the fully extended position. The at least one air port is provided with a venting check valve configured so that the discharge volume from the cylinder out the at least one air port is greater than the inflow.

U.S. Pat. No. 8,016,046, issued Sep. 13, 2011, by Zhao et al., discloses a combustion tool includes a cylinder having a lower end provided with a resilient bumper, a piston dimensioned for reciprocation within the cylinder to impact the bumper at an end of the cylinder and having a driver blade depending therefrom for impacting fasteners. At least one back pressure release opening is disposed in the cylinder to be in alignment with the piston and to be closed by the piston when the piston impacts the bumper.

Conventional exhaust valves for combustion driven fastener tools may employ one or more reed (or petal) valves of steel (e.g. spring steel). Such reed type exhaust valves also may also be employ with newer combustion driven fastener tools having a combustion chamber divided in two portions. These reed valves require relatively precise design and manufacturing to ensure reliable operation and a long service life. In addition, such valves are very sensitive and can be ruined by being inadvertently bent or deformed to even a small degree. Due to the stiffness of the material, such reed valves must employ very secure fastening, e.g. a stiffener plate held tightly over one end of the valve plate by screws. Stresses within the valve plate must never exceed the elastic limit of the material so that it does not permanently deform. In addition, steel is relatively expensive and if such valves become damaged, they must typically be replaced.

In view of the foregoing, there is a need in the art for improved exhaust valve apparatuses for combustion driven fastener hand tools. There is a need for such apparatuses to be simple to design and occupy small spaces. There is also a need for such apparatuses and methods that operate reliably and efficiently over many uses and at a reduced cost. These and other needs are met by the present invention as detailed hereafter.

SUMMARY OF THE INVENTION

An exhaust valve comprising an elastomeric flap portion (e.g. of silicone) covering one or more exhaust ports in a normally closed position for a combustion driven fastener hand tool is disclosed. The elastomeric flap portion is much shorter than a comparable steel reed valve, allowing it to be disposed in small spaces. A single flat piece of elastomeric material can be configured held fixed to a housing surface along a line between one or more pairs of ports such that a flap portion of the material extends to each side of the line and covers one of the pairs of ports. The flat piece can be conveniently held in position against the housing surface by a rib or standoff on the interior surface of an exterior housing. The elastomeric material provides an excellent seal over the ports in the closed position and is inexpensive and resistant to the heat of exhaust gases.

A typical embodiment of the invention comprises an exhaust valve for a combustion driven fastener tool, including a housing forming a combustion chamber having one or more exhaust ports from the combustion chamber to an exterior of the housing and an elastomeric piece held fixed to an area adjacent to the one or more exhaust ports such that at least one flap portion of the flat elastomeric piece extends over the one or more exhaust ports. The elastomeric piece can be flat and/or comprising a rectangular shape or a circular shape. Alternately, the elastomeric piece can have a shaped surface to match a surface of the area adjacent to the one or more exhaust ports. For example, the shaped surface can be cylindrical, wherein the surface of the area adjacent to the one or more exhaust ports is cylindrical. The elastomeric piece can comprise silicone, synthetic rubber, fluoropolymer, fluorosilicone, fluoroelastomer, or perfluoroelastomer.

In further embodiments, the elastomeric piece can be held fixed by a standoff on an exterior housing, the exterior housing covering at least a portion of the housing. In addition, pins on the standoff can fit into holes in the elastomeric piece.

In some embodiments, the elastomeric piece can be held by a linear shape (which can be the standoff or a separate fastening element). The linear shape can comprise a tapered edge contacting the elastomeric piece. In some cases, the linear shape can symmetrically bisect the elastomeric piece. In addition, the linear shape can run parallel to a piston of the combustion chamber.

In some embodiments, the one or more exhaust ports can comprise a plurality of exhaust ports and the elastomeric piece is held fixed to the area adjacent to the plurality of exhaust ports along a linear shape such that the at least one flap portion comprises symmetric flap portions formed to each side of the linear shape, each flap portion covering at least one of the plurality of exhaust ports. The plurality of exhaust ports can be arranged in pairs such that each pair of the exhaust ports is disposed equidistant from the linear shape. Here also, the linear shape can run parallel to a piston of the combustion chamber.

Similarly, a method embodiment of the invention can comprise a method of operating an exhaust valve for a combustion driven fastener tool, including providing a housing forming a combustion chamber having one or more exhaust ports from the combustion chamber to an exterior of the housing and holding an elastomeric piece fixed to an area adjacent to the one or more exhaust ports such that at least one flap portion of the elastomeric piece extends over the one or more exhaust ports. This method embodiment of the invention can be further modified consistent with the any other embodiment of the invention described herein.

Another embodiment of the invention can comprise an exhaust valve for a combustion driven fastener tool, including a combustion chamber means for capturing and harnessing combustion gases within a housing, one or more exhaust port means for expelling the combustion gases from the combustion chamber to an exterior of the housing, and an elastomeric piece held fixed to an area adjacent to the one or more exhaust port means such that at least one flap portion of the elastomeric piece extends over the one or more exhaust port means. The one or more exhaust port means can comprise a plurality of exhaust ports and the elastomeric piece can be held fixed to the area adjacent to the plurality of exhaust ports along a linear shape such that the at least one flap portion comprises symmetric flap portions formed to each side of the linear shape, each flap portion covering at least one of the plurality of exhaust ports. This apparatus embodiment of the invention can be further modified consistent with the any other embodiment of the invention described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

As previously mentioned, embodiments of the invention comprise an exhaust valve for use in a combustion driven fastener hand tool. The exhaust valve is configured as a reed valve comprising an elastomeric flap (e.g. of silicone) covering one or more exhaust ports in a normally closed position. The elastomeric flap is much shorter than a comparable reed valve of less flexible material (such as steel), allowing it to be disposed in small spaces. A single flat piece of elastomeric material can be configured held fixed to a housing surface along a line between one or more pairs of ports such that a flap of the material extends to each side of the line and covers one of the pairs of ports. The flat piece can be conveniently held in position against the housing surface by a rib on the interior surface of an outer housing. The elastomeric material provides an excellent seal over the ports in the closed position and is resistant to the heat of exhaust gases and inexpensive.

There are numerous advantages over conventional stiff material (e.g. steel) reed valves derived from employing an elastomeric exhaust valve according to an embodiment of the present invention. The elastomeric material is very inexpensive compared with stiff materials. In addition, there is little or no chance the elastomeric reed valve will become permanently deformed. Design and construction of an elastomeric reed valve is also simple to accomplish compared with stiff material reed valves due to the fact that deformation is not a problem. The very low stiffness of the elastomeric material also enables a suitable reed valve to occupy a much smaller physical envelope than a steel reed valve for the same application. Finally, the elastomeric reed valve requires relatively little fastening force against the housing surface compared with that required by a stiff material reed valve. Accordingly, there is no need for stiffener plates, screws and threaded holes as needed with stiff material reed valves.

It should also be noted that although example embodiments of the invention are shown herein applied to a combustion driven fastener hand tool which operates using a combustion chamber divided in portions separated by a control valve or plate and charged with a gas and air mixture, e.g. as described in U.S. Pat. No. 8,925,517 by Adams, which is incorporated by reference herein, embodiments of the invention are not limited to this type of combustion chamber or fuel. Instead, embodiments of the invention may be employed with any known combustion chamber that requires an exhaust valve of the combustion chamber where the valve is required to allow flow of combusting gases out of the combustion chamber and resist flow in the opposite direction. Thus, devices using a an exhaust valve for a combustion chamber in any other known application can be used with embodiments of the invention as will be understood by those skilled in the art.

2. Exemplary Combustion Driven Fastener Hand Tool

Figure 1A:
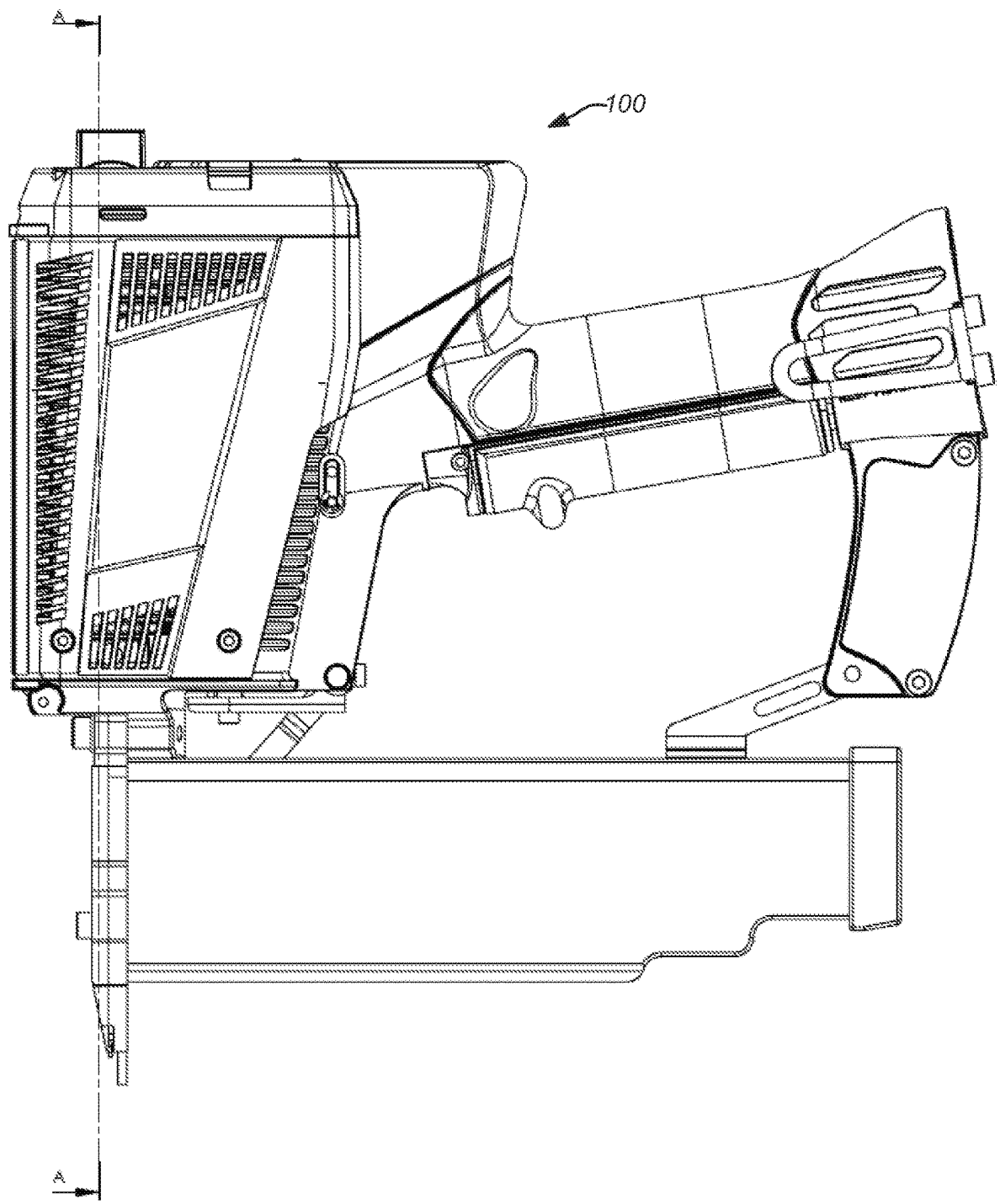
FIGS. 1A-1C show cutaway views of the combustion operation of an exemplary combustion driven fastener hand tool for use with an embodiment of the invention.
Figure 1B:
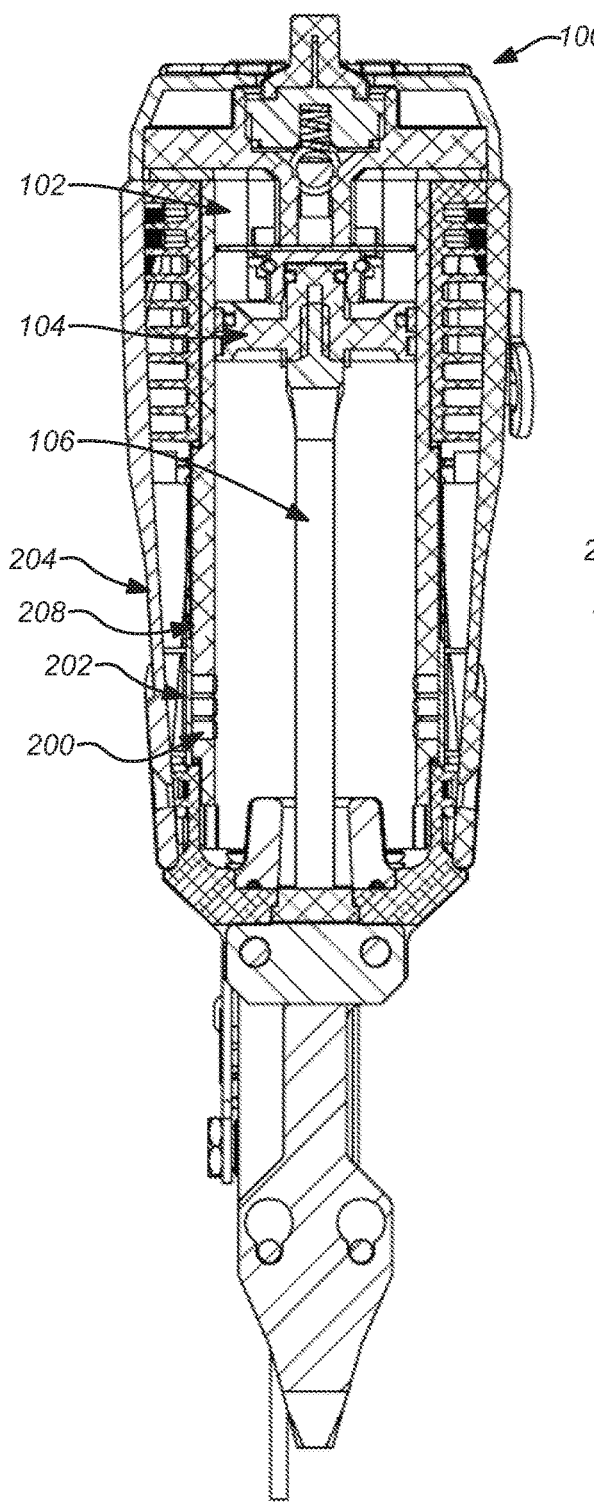
Figure 1C:
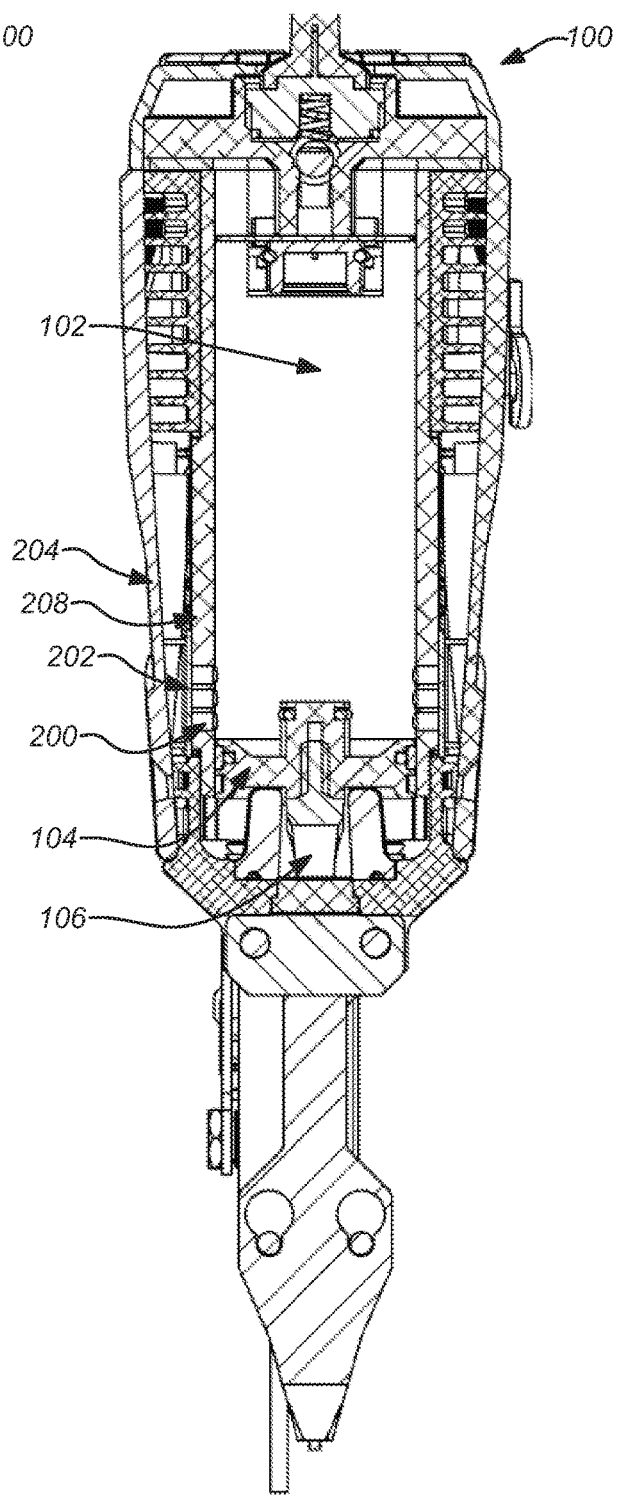

FIGS. 1A-1C show cutaway views of the combustion operation of an exemplary combustion driven fastener hand tool 100 for use with an embodiment of the invention. FIG. 1A identifies the cross section for FIGS. 1B and 1C. FIG. 1B shows the combustion chamber 102 with the piston 104 and driver 106 in position after the combustion chamber 102 is charged with a mixture of air and fuel and just prior to combustion. The piston 104 is near the top of the combustion chamber 102 with the space above filled with the air and fuel mixture and the space below exposed to ambient air.

FIG. 1C shows the combustion chamber 102 after combustion where the piston 104 has been driven downward forcing the fastener (not shown) below the driver 106 into a work piece. Upon combustion within the chamber, combustion gases drive the piston 104 and driver 106 forward (to force the fastener into a work piece). As the piston nears the end of travel it passes exhaust ports 200 in the cylinder wall of the housing 208. Exhaust gases under combustion pressure within the combustion chamber 102 are directed through these ports in the housing 208 to the exhaust valves which allow the high pressure combusting gases to escape to the ambient environment and then close. In FIG. 1C the piston 104 has passed the exhaust ports 200 and allowed the combustion gases within the chamber 102 to force open the flaps of the flat elastomeric piece 202 and exit the chamber 102 leaving a partial vacuum (negative pressure) within the chamber 102. As shown, the flaps are already drawn back to a closed position.

Exhaust valves are an essential component for a combustion driven fastener tool. The exhaust valves are employed to allow the combustion gases to be ejected after driving the fastener and then close. The high velocity of the exhaust gases causes negative pressure trapped in the combustion chamber 102 after the exhaust valves close to force the piston 104 to return to the start position as shown in FIG. 1B. As described hereafter, standoffs can be integrated directly into the exterior housing 204 to fix the flat elastomeric piece 202 against the housing 208 surface without requiring fasteners.

3. Elastomeric Reed Valve for Exhaust Ports

Figure 2:
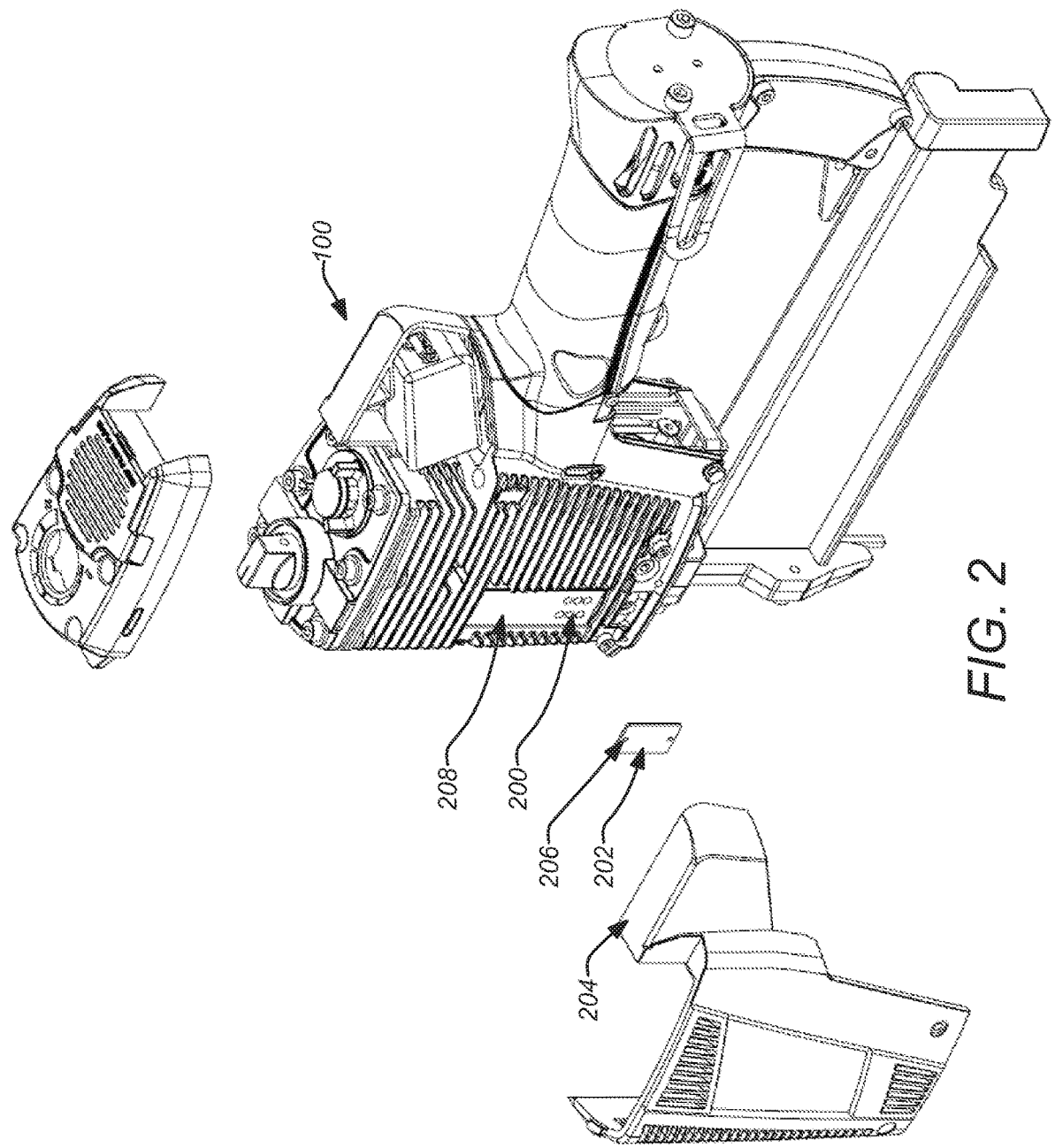
FIG. 2 shows exploded views of an exemplary exhaust valve assembly embodiment of an exemplary combustion driven fastener hand tool.

FIG. 2 shows exploded views of an exemplary exhaust reed valve assembly embodiment for an exemplary combustion driven fastener hand tool 100. The housing 208 of the combustion chamber has one or more exhaust ports 200 which function to allow combustion gases to exit the housing 208 near the end of the piston stroke as described in the previous section. The exhaust reed valve assembly comprises a piece 202 of elastomeric material which is affixed against the housing 208 over the exhaust ports 200. Because the elastomeric material is relatively light and flexible the force required to affix the piece 202 against the housing 208 is far less than would be necessary with a reed valve of steel. Accordingly, in one example a standoff 300 (see FIGS. 3A & 3B) on the interior surface of the exterior housing 204 is capable of providing adequate force to affix the piece 202 against the housing 208 when exterior housing 204 is assembled over the housing 208. Small holes 206 can be molded (or punched) into the piece 202 to be disposed on small pins 302 on the interior surface of the outer housing 204 prior to final assembly in order to hold the piece 202 in proper position.

Figure 3A:
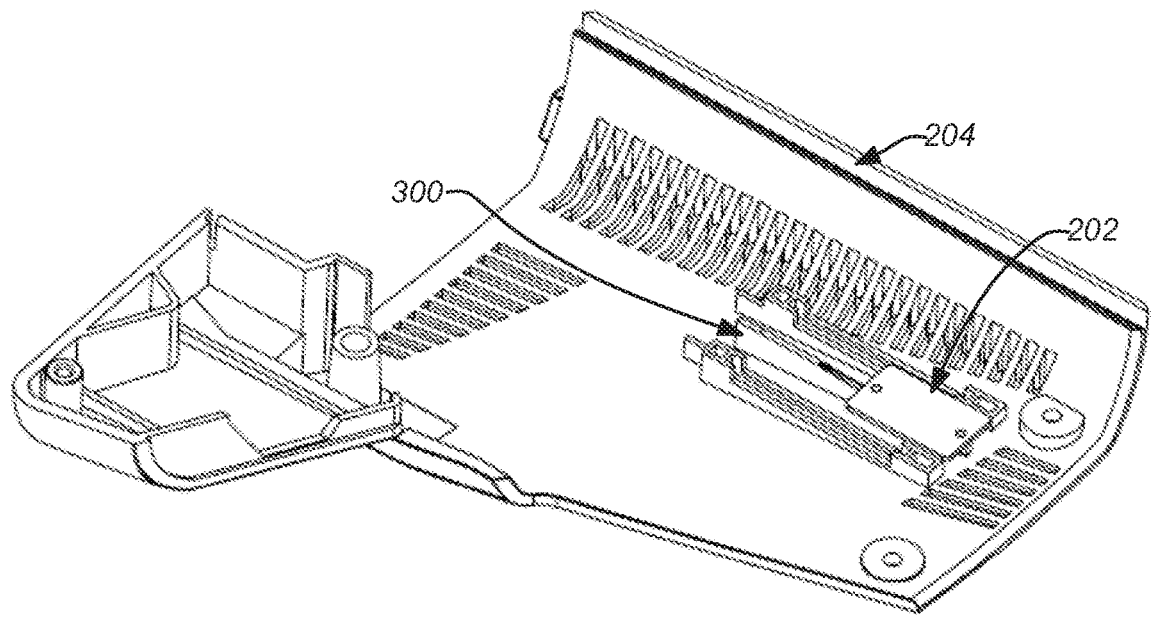
FIGS. 3A and 3B show installation of an exemplary exhaust valve onto the exterior housing of an exemplary combustion driven fastener hand tool.
Figure 3B:
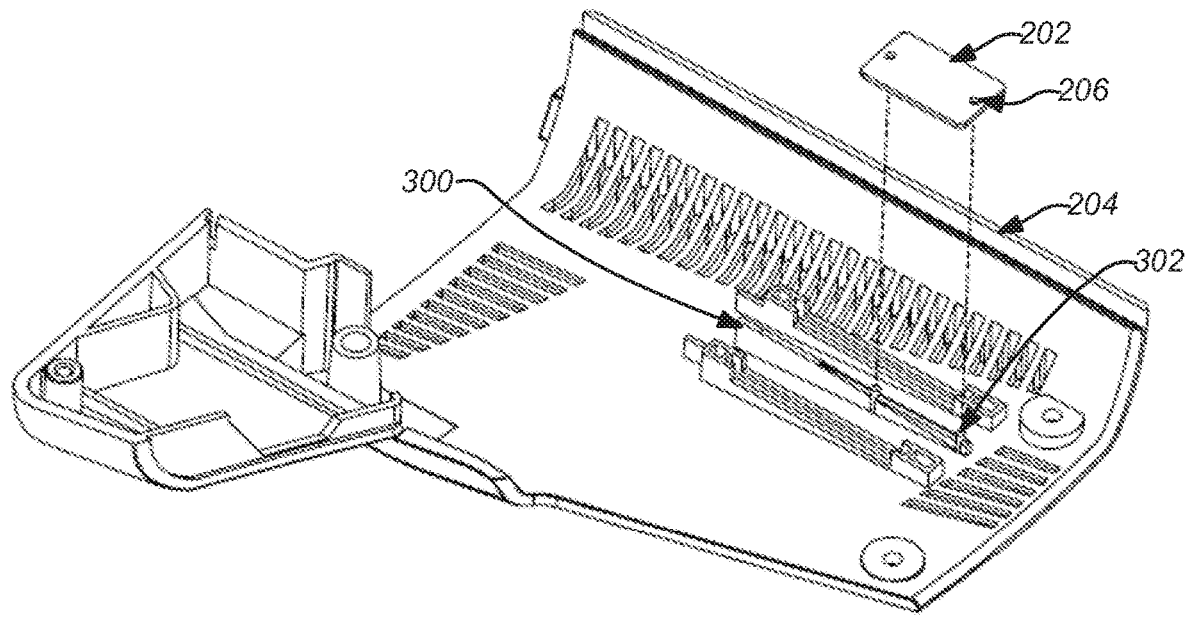

FIGS. 3A and 3B show installation of an exemplary exhaust valve onto the exterior housing of an exemplary combustion driven fastener hand tool. The interior surface of the exterior housing 204 is shown with a standoff 300 molded thereon as part of the exterior housing 204. The small holes 206 of the piece 202 of elastomeric material are placed onto the small pins 302 of the exterior housing 204. In this example, the pins 302 are disposed on the standoff 300. The exterior housing 204 is designed such that when it is assembled onto the primary housing 208 the standoff 300 is disposed between the exhaust ports 200. Thus, the elastomeric material piece 202 is sandwiched between the standoff 300 and the housing 208, i.e. affixed against the housing 208.

A linear shape for the standoff, i.e. a standoff holding the elastomeric piece making a line contact against the elastomeric piece adjacent to a flap portion, is desirable because it defines a line along which a flap portion of the elastomeric material will bend upon opening of the valve. However, those skilled in the art will appreciate that the standoff can be configured in a number of different ways, not limited to the linear shape of the present example. For example, the standoff can be alternately configured as a number of points that contact the surface of the flat elastomeric piece. It is also possible to employ multiple standoffs. For example, two or more linear standoffs formed along a common line (or along different lines that are not collinear) can be used to secure flap portions in different directions from the same flat elastomeric piece.

A flap portion of a larger elastomeric piece need only be secured along a line along which the flap portion will bend to open over the exhaust port that the flap portion covers. Accordingly, the elastomeric piece can be designed to include many separate flap portions in different directions such as a petal valve. (With an elastomeric piece shaped like a petal valve, a plurality of linear shapes would be used, each across a root of the separate "petals," i.e. flap portions, which extend in different radial directions.) In this case, however, use of the elastomeric material affords a much smaller configuration that provides an excellent seal and is inexpensive to produce.

It is also important to note that the linear shape, holding the elastomeric piece making the line along which a flap portion of the elastomeric material will bend, need not be constructed as a standoff 300 on an exterior housing 204. Those skilled in the art will appreciate any suitable technique for applying the linear shape to hold the elastomeric piece making a line contact against the elastomeric piece adjacent to a flap portion can be used. For example, the linear shape can be formed by a reinforcing strap or brace secured over the elastomeric piece, e.g. by screws or other fasteners. Alternately, the linear shape can be formed by an adhesive, e.g epoxy or tape. As described hereafter, the elastomeric piece can also be formed to have features which can be used to provide the linear shape for holding it properly.

Figure 3C:
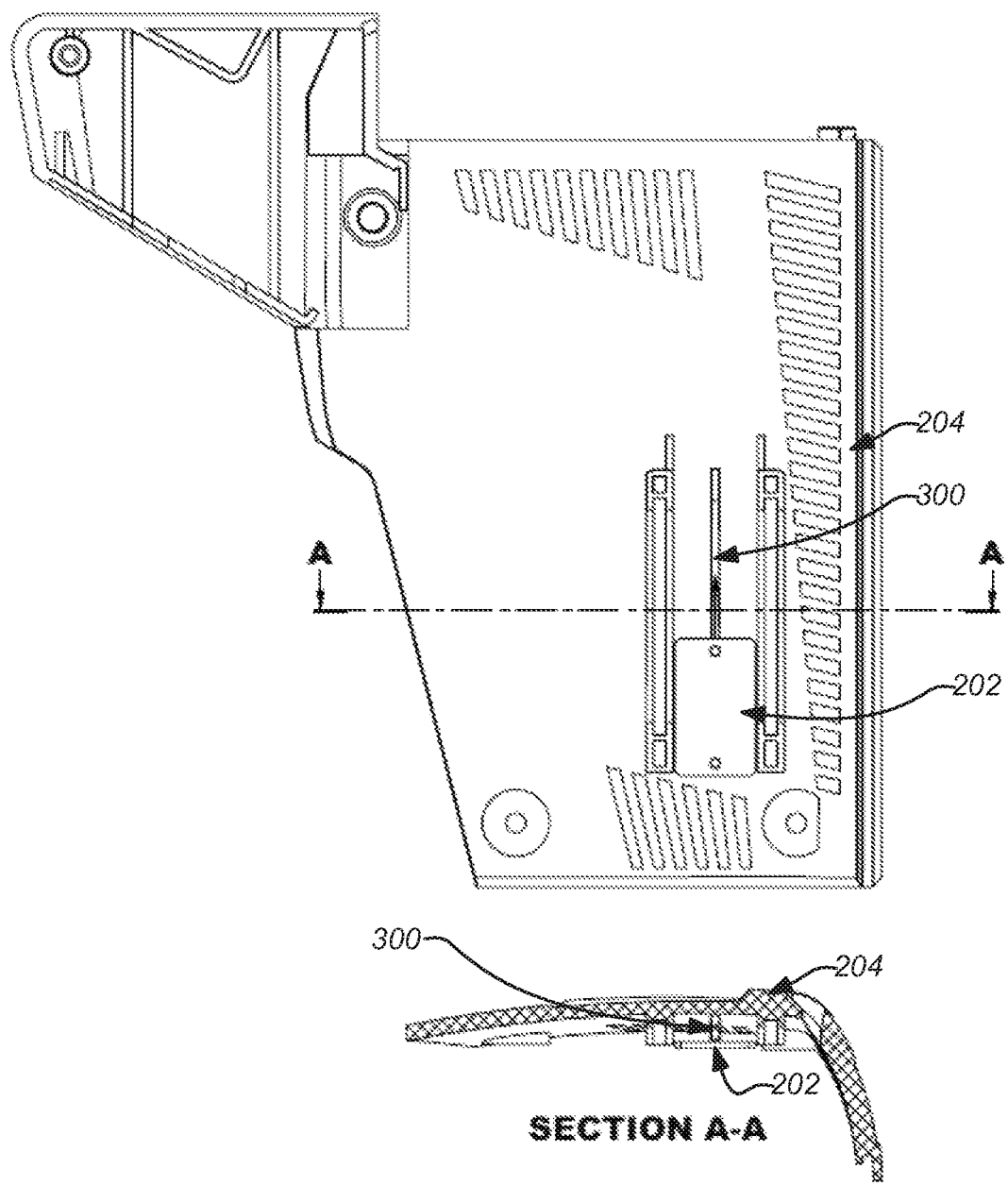
FIG. 3C shows a cross section view of an exemplary exhaust valve installed onto the exterior housing of an exemplary combustion driven fastener hand tool.

FIG. 3C shows a cross section view of an exemplary exhaust valve installed onto the exterior housing of an exemplary combustion driven fastener hand tool. A cross section view (section A-A) of the elastomeric material piece 202 sandwiched between the standoff 300 of the exterior housing 204 and the primary housing 208 is shown. In this example, two valve flaps are formed from a single flat elastomeric piece, with each valve flap extending transverse to the combustion cylinder to cover different sets of exhaust ports on either side. The use of an elastomer enables a very compact valve design. Due to the very low stiffness of the elastomer a very short cantilever length is required (measured between the point fixed by the standoff and the exhaust port (e.g. center of the port).

The elastomeric reed valve offers many advantages over a conventional steel reed valve. This very simple construction replaces a conventional reed valve which would require a significantly longer thin steel plate (due to the material stiffness) which must be very securely fastened at on end using screws threaded into the primary housing along with a reinforcement over the thin steel. In addition, the conventional reed valve requires careful control of its deflection by the exhaust gases so it does not deform. The conventional reed valve requires a more complex design (e.g. to control deflection) more expensive materials (e.g. steel sheet, screws, reinforcement) as well as more time consuming assembly (e.g. forming threaded holes and installing screws).

As described above, the elastomeric piece 202 is typically flat. A flat piece is convenient to manufacture and functions well as the flat flap portions covering the exhaust port(s) readily function as valve(s). However, it is important to note that, even if it is desirable, it is not essential that the entire elastomeric piece 202 is flat. For example, the elastomeric piece 202 can be made having a thickened area along an area for the linear shape for holding it, e.g. a rib section or other feature. This feature of the elastomeric shape can be used to hold it properly, i.e. holding the elastomeric piece making a line along which a flap portion of the elastomeric material will bend, over the exhaust ports.

In addition, it is important to note that the surface of the elastomeric piece which contacts the area adjacent to the one or more exhaust valve also need not be flat. The elastomeric piece can have a surface shaped to match the area adjacent to the one or more exhaust ports. This is a significant advantage over conventional steel reed valves which can only be employed against flat surfaces. Because the elastomeric material can be readily molded to any shape, an elastomeric piece can be readily implemented having any shaped surface desired to match the surface around the exhaust ports that it contact. In one notable example, the shaped surface of the elastomeric piece can be cylindrical in order to match a cylindrical surface of the area adjacent to the one or more exhaust ports that can be used as shown in FIG. 4D. A cylindrical surface for a combustion chamber housing is a natural option for machined parts. Employing a matched surface elastomeric piece eliminates the need to separately cut a flat area around the exhaust ports. Of course, any other surface shapes are also possible based on the particular application and area around the exhaust ports.

Figure 4A:
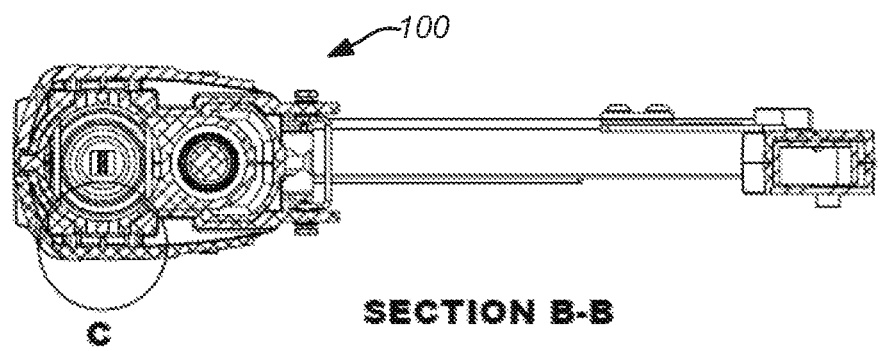
FIG. 4A shows a cross section view of an exemplary exhaust valve installed in the final assembly an exemplary combustion driven fastener hand tool.
Figure 4A:
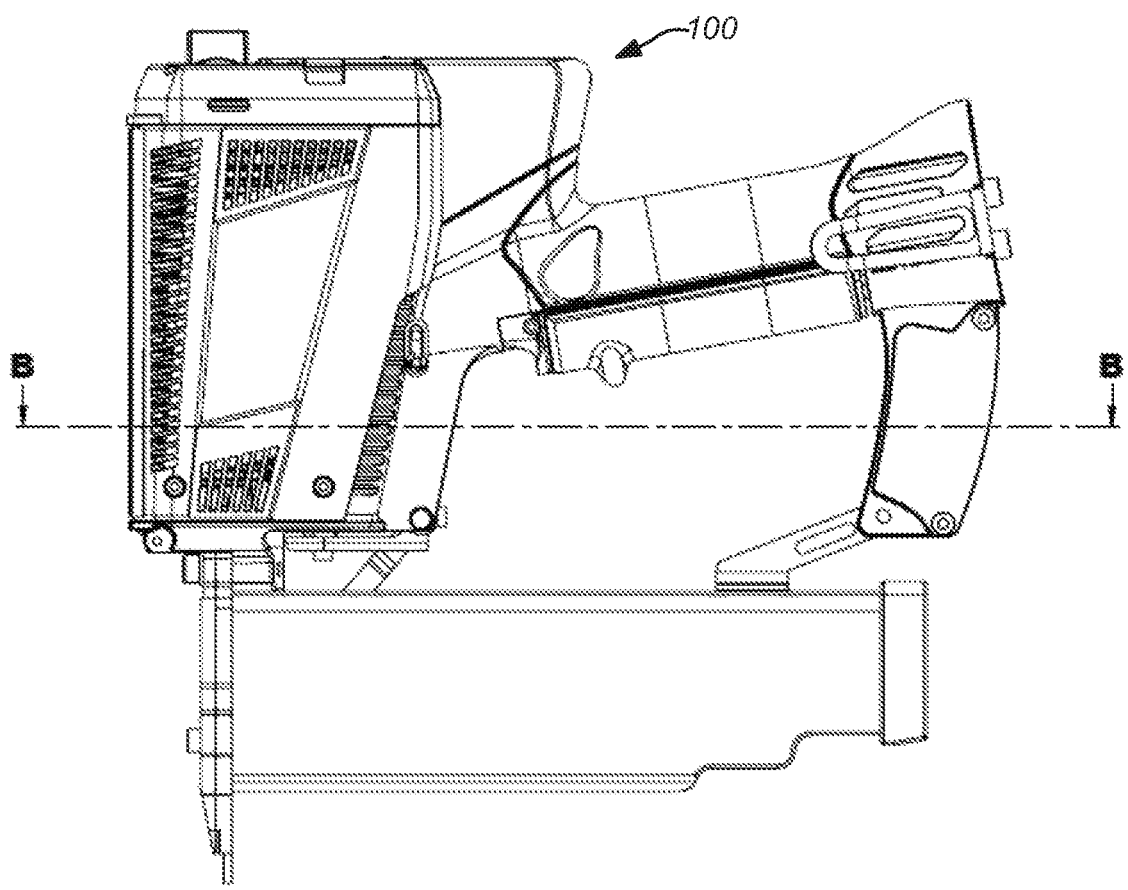
Figure 4B:
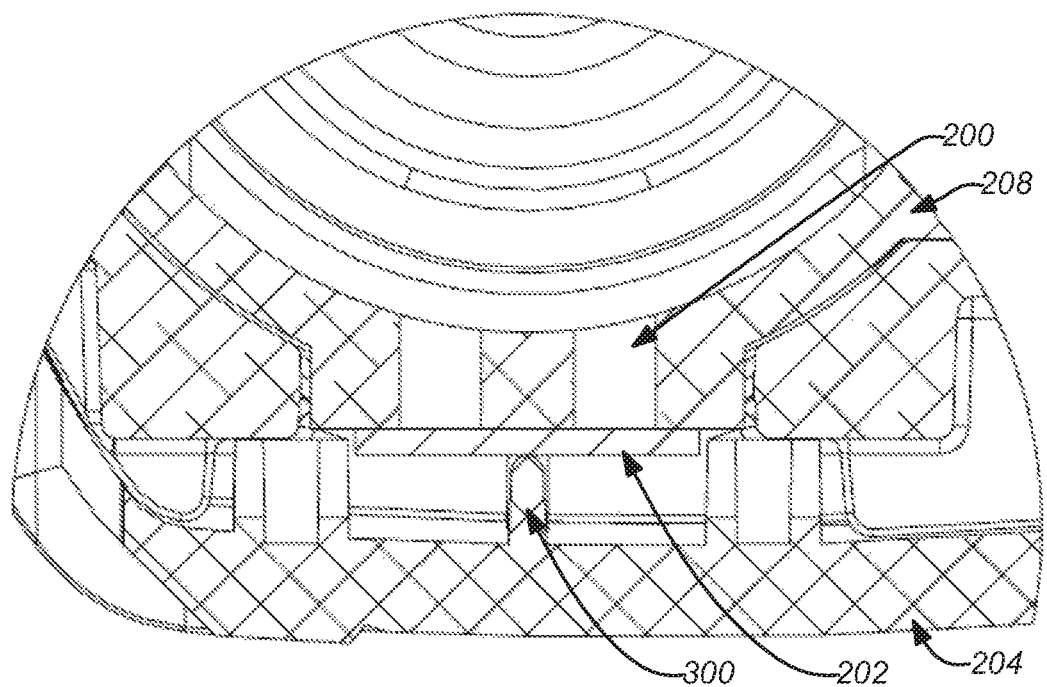
FIGS. 4B and 4C show closeup cross section views of detail C indicated in FIG. 4A of an exemplary exhaust valve operating and FIG. 4D shows a cylindrical shaped surface of the elastomeric piece in order to match a cylindrical surface of the area adjacent to the one or more exhaust ports.
Figure 4C:
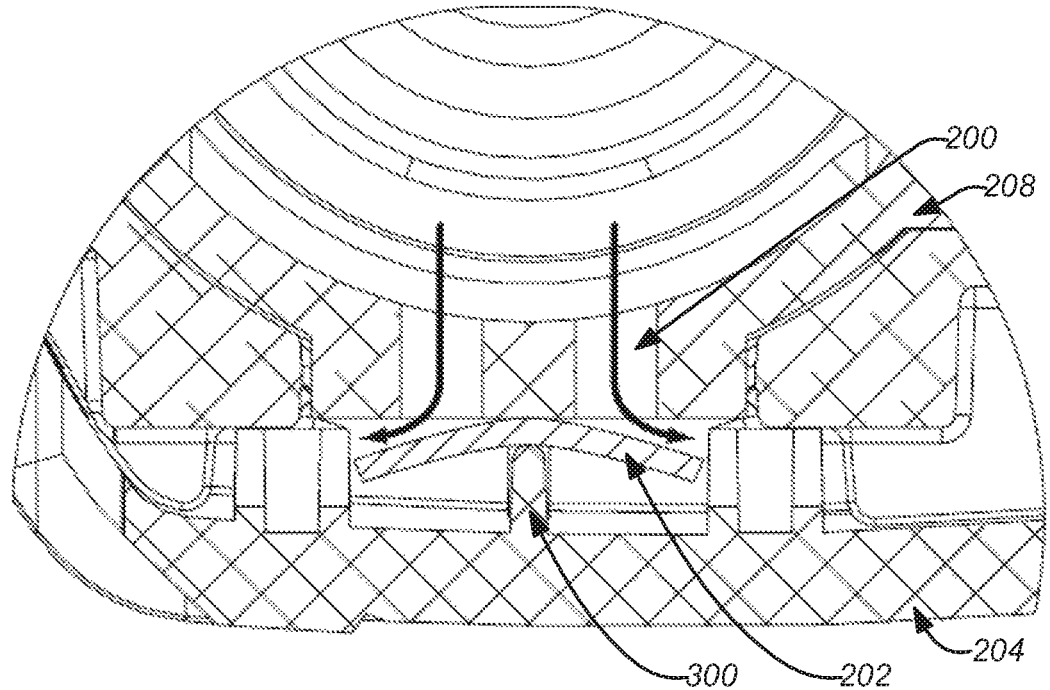
Figure 4D:
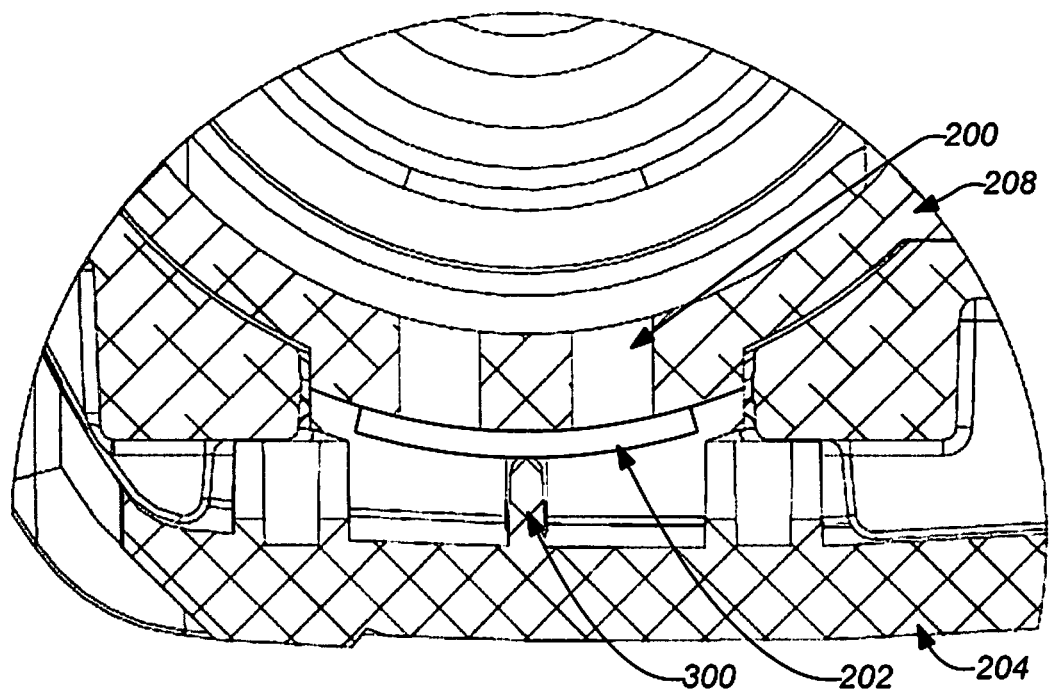

FIG. 4A shows a cross section view of an exemplary exhaust valve installed in the final assembly an exemplary combustion driven fastener hand tool. FIGS. 4B and 4C show closeup cross section views of detail C indicated in FIG. 4A of an exemplary exhaust valve operating. It should be noted that the shape of the standoff 300 where it contacts the flat elastomeric piece 202 has a tapered edge (or is rounded). FIG. 4B shows the exhaust valve prior to combustion. The flat elastomeric piece 202 is held against the housing 208 by the standoff 300 of the exterior housing 204 closing the exhaust ports 200. FIG. 4C shows the valve during combustion after the piston has traveled to a point past the exhaust ports 200. The exhaust gases are now able to pass through the ports 200 and force open the flap portions of the flat elastomeric piece 202 (as indicated by the arrows).

The flap portions deform (bend) from the point that the standoff 300 holds the elastomeric piece 202 against the housing 208. The velocity of the exhaust gases out of the ports 200 yields a negative pressure (i.e., a pressure lower than ambient pressure) within the combustion chamber. The pressure differential between the negative pressure in the combustion chamber and the ambient pressure causes the exhaust valves to immediately close (appearing as shown in FIG. 4B) forming a seal between the elastomeric piece 202 and the surface of the housing 208 surrounding the exhaust ports. The seal here is important as it maintains the negative pressure within the combustion chamber which additionally causes the piston to be automatically drawn back up to the start position ready for the next firing. The elastomeric material is ideal for forming such a seal again the smooth (typically, but not necessarily, metal) surface of the housing 208.

In addition to the foregoing, symmetry can be usefully employed in the application of an elastomeric reed valve. In some cases, the linear shape used to hold the elastomeric piece can symmetrically bisects the elastomeric piece. See e.g. FIGS. 4B and 4C. In the example, a simple standoff holds down the elastomeric piece such that the valve opens simultaneously on two opposite symmetric sides. This ensures that the forces of the escaping exhaust gases will bend the two equal flap portions in opposing directions simultaneously and equally thereby prevent the elastomeric piece from moving out of position.

In order to ensure that application of the exhaust gases are applied to matching pairs of exhaust ports in order to achieve the balance described above, i.e. simultaneously and equally, it is desirable, but not required, to apply the linear shape that holds the elastomeric piece so that it runs parallel to the piston of the combustion chamber. As shown in the primary example embodiment, symmetric flap portions are formed to each side of the linear shape. See e.g. FIGS. 2, 4B and 4C. Each flap portion covers at least one of matching pairs of exhaust ports. The pairs of exhaust ports are symmetrically disposed equidistant from the linear shape of the standoff which runs between them. Alignment of the linear shape parallel to the piston facilitates the balanced application of exhaust gases to the elastomeric piece because the exhaust gases are directed through pairs of exhaust ports as the piston passes each pair in sequence. See FIGS. 1B and 1C.

The material of the elastomeric piece can be any suitable elastomeric material that can survive the temperatures and combustion gases. For example, suitable silicone, synthetic rubber, fluoropolymer (e.g. viton), fluorosilicone, fluoroelastomer, perfluoroelastomer and other suitable polymers can be employed. The particular elastomer chosen for a given application will depend upon the requirements for temperature resistance, durability, stiffness, etc. as will be understood by those skilled in the art. The elastomeric material must be able to withstand a high heat flame, but also have sufficient flexibility to open quickly and sufficient stiffness to quickly return to its original shape. Designs having a short cantilever length make use of the reduced stiffness of the elastomeric material (compared with steel reed valves). In addition, the hardness of the material will relate to the flexibility and stiffness and therefore affect how quickly the valve will open and close.

Although not required, a suitable elastomeric material can have a durometer value in the range of 50 to 60. A lower durometer value will yield quicker and easier movement of the flap portions. However, too low a durometer value may cause the flap portions to have difficulty closing. A higher durometer value is better in this regard, because the flap portions will retain their default shape more providing a tendency to snap back and close more quickly. There is a balance between these factors. In addition, the durometer value should be selected considering the physical size of the valve application. Those skilled in the art can determine an optimum durometer value to use, along with other properties of the elastomeric material, for a given application without undue experimentation.

In one example embodiment, the elastomeric piece 202 can be approximately 13 mm wide by 22 mm tall at 1 mm thick. However, the particular length and width in a given application will depend on the port sizes and placement which in turn will depend on the combustion chamber size. In general, a short flap portion is used, i.e. significantly shorter than any comparable reed valve made of metal would be. Typically, a thin piece is desirable because it tends to flex better and return quickly. However, a piece that is too thin is not good as it will not be as durable and may have difficulty retaining its flatness. The particular dimensions for a given application can be readily determined by one skilled in the art without undue experimentation.

Figure 5A:
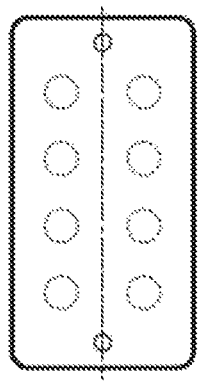
FIGS. 5A-5N show some alternate elastomeric plate and exhaust port configurations.
Figure 5B:
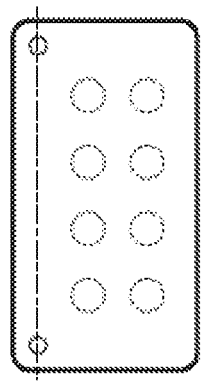
Figure 5C:
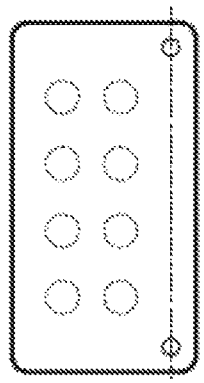
Figure 5D:
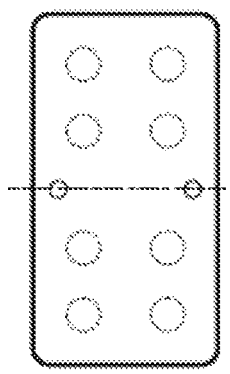
Figure 5E:
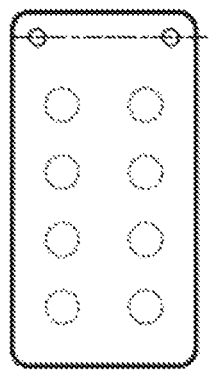
Figure 5F:
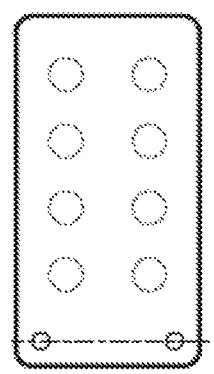
Figure 5G:
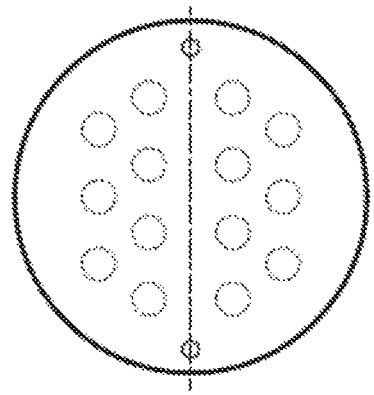
Figure 5H:
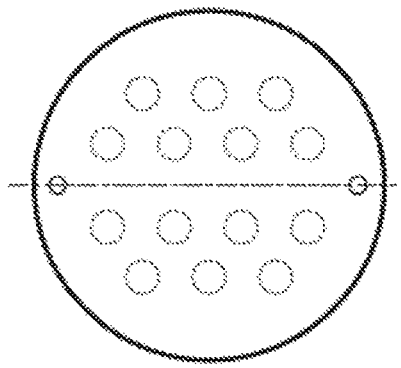

FIGS. 5A-5N show some alternate elastomeric plate and exhaust port configurations. In the figures, the orientation of the exhaust ports is such that the top of each respective figure is the positioned toward the top of the combustion chamber. The relative position of the associated exhaust ports is shown as dotted circles in each example. (It should be noted that exhaust ports having other than circular shapes can also be employed.) In addition, the linear shape for holding each of the different configations is also identified by a dashed straight line across to small holes (which can be pinned as described previously). The configurations of FIGS. 5A, 5G and 5L afford the symmetry and balanced exhaust gases as previously described, having a linear shape holdown parallel to the piston and symmetrically bisecting the elastomeric piece. The configurations of FIGS. 5D, 5H, and 5I employ a linear shape holdown symmetrically bisecting the elastomeric piece but the linear shape runs transverse to the piston direction. Accordingly, the exhaust gases will strike the upper ports before the lower ports as the piston passes. Provided the elastomeric piece is suitably retained, such "unbalanced" alternate configurations can also be used.

Those skilled in the art will appreciate that embodiments of the invention encompass any number exhaust ports which may be arranged in any pattern and having an elastomeric piece covering those ports held fixed to the housing in an area adjacent to the ports. In addition, the elastomeric piece is not limited to having either a rectangular or circular shape, but can be configured having any desired shape. Furthermore, the flat elastomeric piece may be fixed along a line or at one or more points. It is only necessary that exhaust gases being driven out of the ports can force the flat piece open momentarily to allow the gases to escape.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An exhaust valve for a combustion driven fastener tool, comprising:
   a housing forming a combustion chamber having one or more exhaust ports from the combustion chamber through a wall of the housing to an ambient environment at an exterior of the housing and not into any secondary combustion chamber; and
   an elastomeric piece held fixed against the housing to a flat area adjacent to the one or more exhaust ports such that at least one flap portion of the elastomeric piece extends over the one or more exhaust ports;
   wherein the elastomeric piece is flat and held fixed by a linear shaped element and the linear shaped element holds the elastomeric piece fixed such that the exhaust valve opens on two opposite symmetric sides of the linear shaped element and the elastomeric piece does not move from the housing along the linear shaped element and a surface of the linear shaped element in contact with the elastomeric piece runs parallel to a piston travel of the combustion chamber.

2. The exhaust valve of claim 1, wherein the linear shaped element comprises a standoff on an exterior housing, the exterior housing covering at least a portion of the housing holding the elastomeric piece fixed.

3. The exhaust valve of claim 2, wherein pins on the standoff fit into holes in the elastomeric piece.

4. The exhaust valve of claim 1, wherein the linear shaped element comprises a tapered edge contacting the elastomeric piece.

5. The exhaust valve of claim 1, wherein the linear shaped element symmetrically bisects the elastomeric piece.

6. The exhaust valve of claim 1, wherein the elastomeric piece comprises an elastomeric material selected from the group consisting of silicone, synthetic rubber, fluoropolymer, fluorosilicone, fluoroelastomer, and perfluoroelastomer.

7. The exhaust valve of claim 1, wherein the elastomeric piece comprises a rectangular shape.

8. The exhaust valve of claim 1, wherein the elastomeric piece comprises a circular shape.

9. The exhaust valve of claim 1, wherein the one or more exhaust ports comprise a plurality of exhaust ports and the elastomeric piece is held fixed to the area adjacent to the plurality of exhaust ports along the linear shaped element such that the at least one flap portion comprises symmetric flap portions formed to each side of the linear shaped element, each flap portion covering at least one of the plurality of exhaust ports.

10. The exhaust valve of claim 9, wherein the plurality of exhaust ports are arranged in pairs such that each pair of the exhaust ports is disposed equidistant from the linear shape.

11. The exhaust valve of claim 9, wherein the linear shaped element runs parallel to a piston of the combustion chamber.

12. A method of operating an exhaust valve for a combustion driven fastener tool, comprising:
providing a housing forming a combustion chamber having one or more exhaust ports through a wall of the housing from the combustion chamber to an ambient environment at an exterior of the housing and not into any secondary combustion chamber; and
holding an elastomeric piece fixed against the housing to a flat area adjacent to the one or more exhaust ports such that at least one flap portion of the elastomeric piece extends over the one or more exhaust ports;
wherein the elastomeric piece is flat and held fixed by a linear shaped element and the linear shaped element holds the elastomeric piece fixed such that the exhaust valve opens on two opposite symmetric sides of the linear shaped element and the elastomeric piece does not move from the housing along the linear shaped element and a surface of the linear shaped element in contact with the elastomeric piece runs parallel to a piston travel of the combustion chamber.

13. The method of claim 12, wherein the linear shaped element comprises a standoff on an exterior housing, the exterior housing covering at least a portion of the housing holding the elastomeric piece fixed.

14. An exhaust valve for a combustion driven fastener tool, comprising:
a combustion chamber means for capturing and harnessing combustion gases within a housing;
one or more exhaust port means through a wall of the housing for expelling the combustion gases from the combustion chamber means to an ambient environment at an exterior of the housing and not into any secondary combustion chamber; and
an elastomeric piece held fixed against the housing to a flat area adjacent to the one or more exhaust port means such that at least one flap portion of the elastomeric piece extends over the one or more exhaust port means;
wherein the elastomeric piece is flat and held fixed by a linear shaped element and the linear shaped element holds the elastomeric piece fixed such that the exhaust valve opens on two opposite symmetric sides of the linear shaped element and the elastomeric piece does not move from the housing along the linear shaped element and a surface of the linear shaped element in contact with the elastomeric piece runs parallel to a piston travel of the combustion chamber.

15. The exhaust valve of claim 14, wherein the linear shaped element comprises a standoff on an exterior housing means for covering at least a portion of the housing holding the elastomeric piece fixed.

* * * * *